Figure 1:
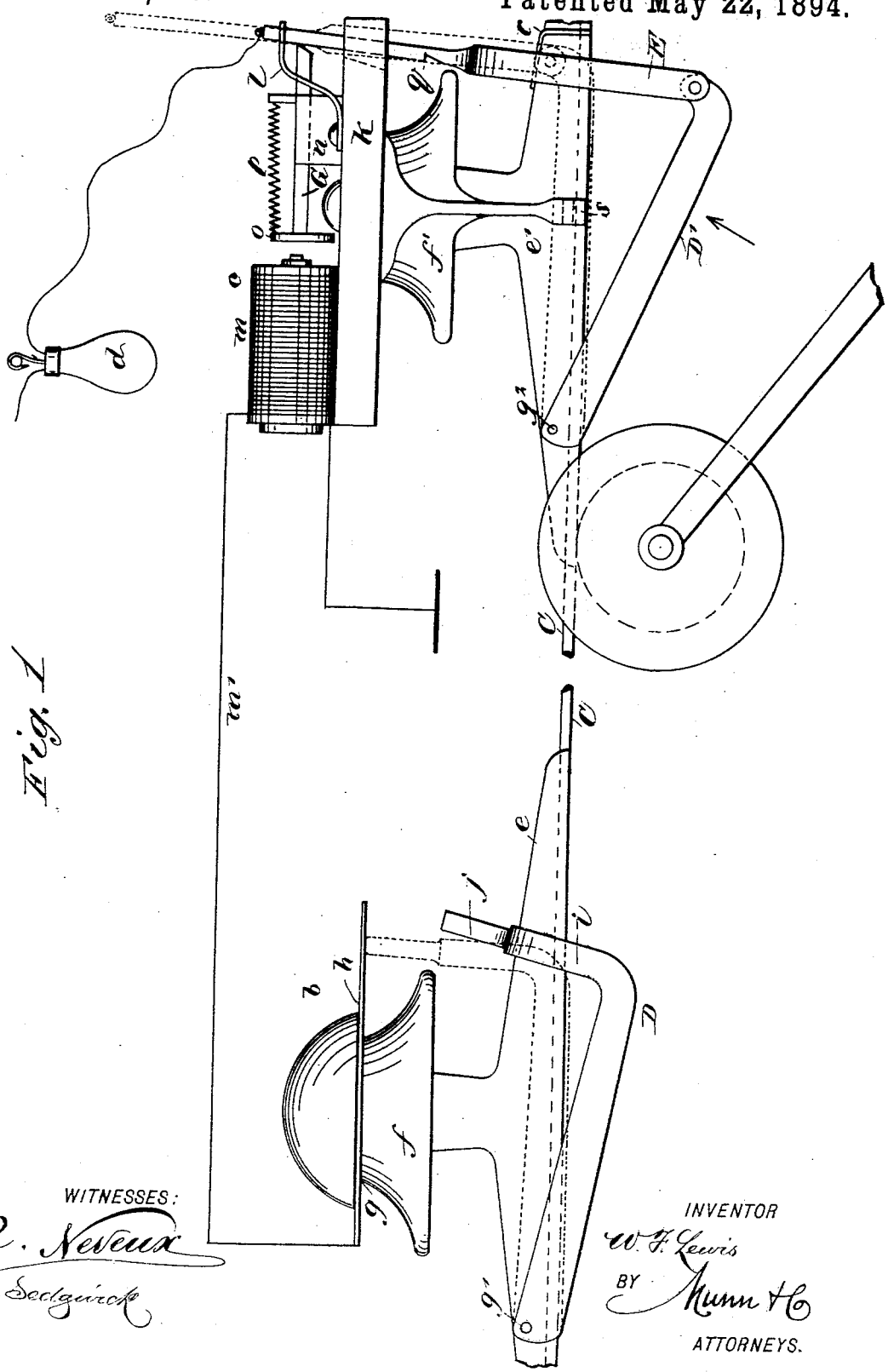

(No Model.)
2 Sheets—Sheet 1.

W. F. LEWIS.
BLOCK SYSTEM FOR TROLLEY RAILWAYS.

No. 520,323.  Patented May 22, 1894.

WITNESSES:
C. Neveux
C. Sedgwick

INVENTOR
W. F. Lewis
BY Munn & Co
ATTORNEYS.

(No Model.) 2 Sheets—Sheet 2.
W. F. LEWIS.
BLOCK SYSTEM FOR TROLLEY RAILWAYS.
No. 520,323. Patented May 22, 1894.
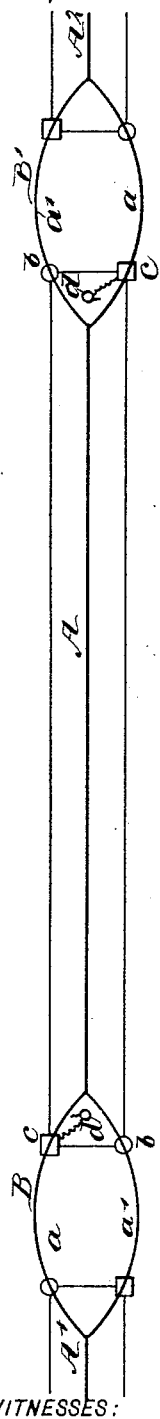
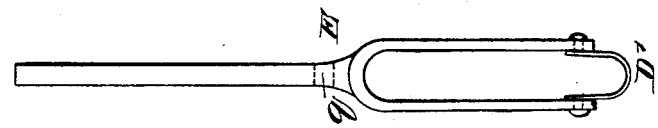
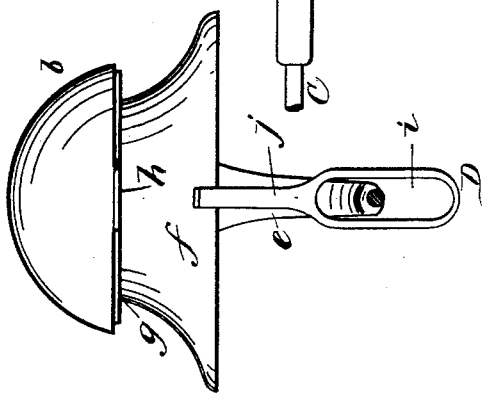
WITNESSES:
C. Neveux
C. Sedgwick
INVENTOR
W. F. Lewis
BY
Munn & Co
ATTORNEYS.

UNITED STATES PATENT OFFICE.

WILLARD F. LEWIS, OF SWAMPSCOTT, MASSACHUSETTS.

BLOCK SYSTEM FOR TROLLEY-RAILWAYS.

SPECIFICATION forming part of Letters Patent No. 520,323, dated May 22, 1894.

Application filed July 20, 1893. Serial No. 481,028. (No model.)

*To all whom it may concern:*

Be it known that I, WILLARD FRANCIS LEWIS, of Swampscott, in the county of Essex and State of Massachusetts, have invented a new and Improved Block System for Trolley-Railways, of which the following is a specification, reference being had to the annexed drawings, forming a part thereof, in which—

Figure 1 is a side elevation of the apparatus used at the opposite ends of a block constructed according to my improved system. Fig. 2 is a front elevation of the double insulator. Fig. 3 is a plan view of the releasing device. Fig. 4 is a perspective view of the lever operated by the trolley. Fig. 5 is a front elevation of the contact arm; and Fig. 6 is a plan view of an entire block and portions of blocks adjacent thereto.

Similar letters of reference indicate corresponding parts in all the views.

The object of my invention is to provide a system for single track trolley railways, wherein a section or turnout may be so guarded as to prevent the cars from causing unnecessary waits when headed in two opposite directions on the same section, and enable lost time to be made up without interfering with other cars that are on time; also to avoid collisions between cars moving in opposite directions.

My invention consists in a contact device connected with one of the trolley wire hangers and arranged to make contact with the line wire, a second contact device for making an electrical contact for a day or night signal, as for instance a lamp, and electro-magnetic releasing apparatus connected with the contact devices, for extinguishing the lamp after the car has passed the turn-out, all as will be hereinafter more fully described.

The single track A is provided with turn-outs B, B', at suitable intervals. Each turn-out is composed of the tracks $a$ $a'$, connected by suitable switches with the main track A. Above the track $a'$ is placed an electric switch $b$, in the trolley wire belonging to the said track, and above the track $a$ is placed a releaser $c$ in the trolley wire belonging to the said track $a$. The electric switch $b$ of the turn-out B is connected with the releaser $c$ of the turn-out B', and the releaser $c$ of the turn-out B is connected with the electric switch $b$ of the turn-out B'. The said switches and releasers serve in connection with the electric lamps $d$, to protect the track section A. The sections A' and A², which communicate through the turn-outs B or B' with the section A, are protected in a similar manner. The electric switch $b$ which is connected with the trolley wire belonging to the track $a'$ of the turn-out B, is shown in enlarged detail in Fig. 1.

The trolley wire C is secured to a hanger $e$ connected with the insulator $f$. The said insulator is provided with a groove $g$ for receiving the contact spring $h$. The insulator $f$ is supported in the usual way from suspension wires extending across the railway track, or by attachment to brackets or other suitable supports. To the hanger $e$ is pivoted at $g'$, an angled arm D, the pivoted end of which is of U-shaped cross section, while the free swinging end is made in the form of an oblong loop $i$, which embraces the trolley wire and the hanger $e$, and from the upper end of the said oblong loop $i$ extends a contact piece $j$. The arm D is arranged in such relation to the contact spring $h$, as to make an electrical contact with the said spring when the arm is forced upward by the pressure of the trolley as it rolls along the wire C.

The releaser $c$ located at the opposite end of the section A, and connected with the electric switch $b$ just described, is mounted on an insulator $f'$, which supports the hanger $e'$ attached to the trolley wire C. To the hanger $e'$ is pivoted the lever D', at $g^2$. The said lever is of U-shaped cross section, and to its free end is pivoted the forked rod E, which embraces the hanger $e'$. The upper end of the said rod passes through a plate $k$ of insulating material, and through a guide $l$ secured to the said plate, and is connected electrically with one terminal of the electric lamp $d$, the other terminal of the said lamp being grounded. On the insulating plate $k$ is mounted an electro-magnet $m$, one terminal of which is connected by the wire $m'$ with the contact spring $h$ of the electric switch $b$, the other terminal being grounded.

In a guide $n$ secured to the insulating plate $k$, is placed a sliding catch bolt G, carrying at the end adjoining the magnet m, an armature o. The said armature is provided with a retractile spring p, which holds it normally away from the poles of the magnet. The outer end of the catch bolt G is beveled, and in the forked rod E is formed a notch q, which receives the beveled end of the bolt G, when the rod E is raised by contact of the trolley wheel with the lever D'. The hanger e' is provided with an electric contact piece r, with which the forked end of the rod E contacts when the said rod drops after being released in the manner presently to be described.

The insulator f' is provided with an arm s, projecting from one side thereof for supporting the wire m', in actual practice. (In the present case the said wire is shown diagrammatically for the sake of clearness.)

The operation of my improved device is as follows: When a car moves from the track section A' upon the track a' of the turn-out after it has operated the device belonging to the section A', the trolley wheel presses the lever D upwardly, bringing the contact point j into contact with the spring h, when the current flowing from the trolley wire or the hanger e, or both, passes through the contact spring h, through the wire m' and magnet m to the ground, thus energizing the said magnet m, causing it to draw the armature o forward, thus releasing the forked rod E, allowing it to fall, taking the position shown in full lines in Fig. 1, thus making contact between the rod E and the contact piece r, and sending a current through the lamp d, thereby indicating to the motorman approaching on a car from the opposite direction, that the section is occupied. When the car reaches the end of the section A and passes to the track section a' of the turn-out B', the trolley wheel carried by the car presses the lever D' and rod E upwardly, causing them to take the position shown in dotted lines, when the bolt G engages the notch q and holds the rod E in an elevated position until it is again released. As the said rod E is raised it breaks the circuit of the lamp d, thereby indicating to a car coming from the track section A², that the track is clear. When a car approaches the section A from the section A², what has just been described occurs in the reverse order, that is to say, the electric switch b is operated, thereby releasing the rod E at the opposite end of the section, and causing the lamp d to be illuminated, thus indicating to any one approaching from the track section A', that the section A is occupied.

Where it is necessary to use my improved system in the daytime, a semaphore or equivalent device will be attached to the rod E, and displayed whenever the said rod is dropped in the manner already described. It is obvious also, that when desirable, an audible signal may be connected with the said rod E. For example, an electric bell may be placed in the circuit in the place of the lamp d. The closing of the circuit by the dropping of the rod E, will cause the bell to ring. It is obvious that instead of employing the current used for charging the trolley wire for the purpose of giving the signal and lighting the lamp, I may use a separate source of current by connecting the levers D D' with such source.

Having thus described my invention, I claim as new and desire to secure by Letters Patent—

1. In a block system for trolley railways, the combination with the trolley wire, and a contact maker arranged at one end of a track section and comprising a pivoted angled arm D, suspended normally below the line of the trolley wire and arranged to be operated by the trolley wheel and an electrical contact piece against which the arm is swung when operated, of an electro magnetic releasing device arranged at the other end of the section and controlled by the contact maker, and a circuit closing device arranged to close a signal circuit when released by the electro magnetic device, substantially as set forth.

2. In a block system for trolley railways, the combination with the single track A, and the turnouts B, B', of the electric switch b, arranged above one of the tracks of the turnout, the releasing device c arranged above the corresponding track of the succeeding turnout, an electric signal, and a circuit closer operated by the releasing device, for closing the signal circuit, substantially as set forth.

3. In a block system for trolley railways the combination with the hanger e, of the angled arm D pivoted at one end to the hanger and its free end held normally below the line of the trolley wire, the said angled arm provided with the loop i extending upward from its free end to embrace the hanger and trolley wire and to rest upon said hanger when the angled arm is in its normal position, and having a contact arm j extending upward from the loop, and the electrical contact piece h arranged in the path of the said arm, substantially as set forth.

4. The combination with the hanger e' and trolley wire c of the lever D' pivoted at one end to the hanger, the rod E, pivoted to the free end of the lever and provided with an engaging notch, a sliding catch bolt G, carrying an armature at one end, and arranged to hold the rod E when raised, the releasing magnet m, and a contact piece with which the rod E makes contact when released, substantially as set forth.

5. The combination with the hanger e' and the trolley wire c, of the lever D', the rod E pivoted to the free end of the lever, and provided with an engaging notch q, the spring pressed sliding catch bolt G, the releasing magnet m, the contact piece r and the electrical signal lamp d, substantially as specified.

6. The combination with the hanger e' and trolley wire c, of the lever D', the rod E forked to embrace the hanger and having an upwardly extending arm connected electrically with one terminal of an electric lamp and provided with an engaging notch, a sliding catch bolt adapted to engage the rod, a releasing magnet, a contact piece r, an electric signal lamp d, and a circuit closer for operating the releasing magnet, substantially as set forth.

WILLARD F. LEWIS.

Witnesses:
 JACOB M. LEWIS,
 EDWARD S. NEWHALL.